United States Patent [19]

Yarger

[11] 3,740,829
[45] June 26, 1973

[54] METHOD OF MAKING A CAM SHAFT WITH A SHAFT COUPLING AND ARTICLE PRODUCED THEREBY

[76] Inventor: Donald L. Yarger, 22511 W. Grant, Marengo, Ill. 60152

[22] Filed: Oct. 15, 1971

[21] Appl. No.: 189,495

[52] U.S. Cl. ................... 29/470.5, 74/567, 74/597
[51] Int. Cl. ........................................ B23k 31/02
[58] Field of Search .................. 29/469, 428, 156.4, 29/418, 416, 517, 520, 525, 479, DIG. 4, 429, 447, 149 S, 149 B, 149 C, 149 D, 149 P, 420, 490, 491, 6, 52 S, 470.5; 74/597, 596, 567, 568, 569

[56] References Cited
UNITED STATES PATENTS

| | | | |
|---|---|---|---|
| 1,309,804 | 7/1919 | Kelsey | 148/16.5 UX |
| 2,275,177 | 3/1942 | Crans | 148/16.5 |
| 2,364,109 | 12/1944 | Taylor | 74/597 |
| 3,204,482 | 9/1965 | Behnke | 74/567 |

*Primary Examiner*—Charles W. Lanham
*Assistant Examiner*—Joseph A. Walkowski
*Attorney*—Vernon J. Pillote

[57] ABSTRACT

A method of making a cam shaft having a trunnion at one end of the cam and a blind end shaft coupling internally of the trunnion for connection to an external shaft wherein a coupling member is formed with a cylindrical outer bearing surface and an internally keyed bore extending therethrough dimensioned for connection to an external keyed shaft, a cam member is formed with a shaft stub extending from one end face eccentric to its peripheral cam surface, and the coupling is thereafter assembled on the shaft stub and brazed to the end face of the cam to form a trunnion at the end of the cam having a blind end shaft coupling internally of the trunnion.

6 Claims, 10 Drawing Figures

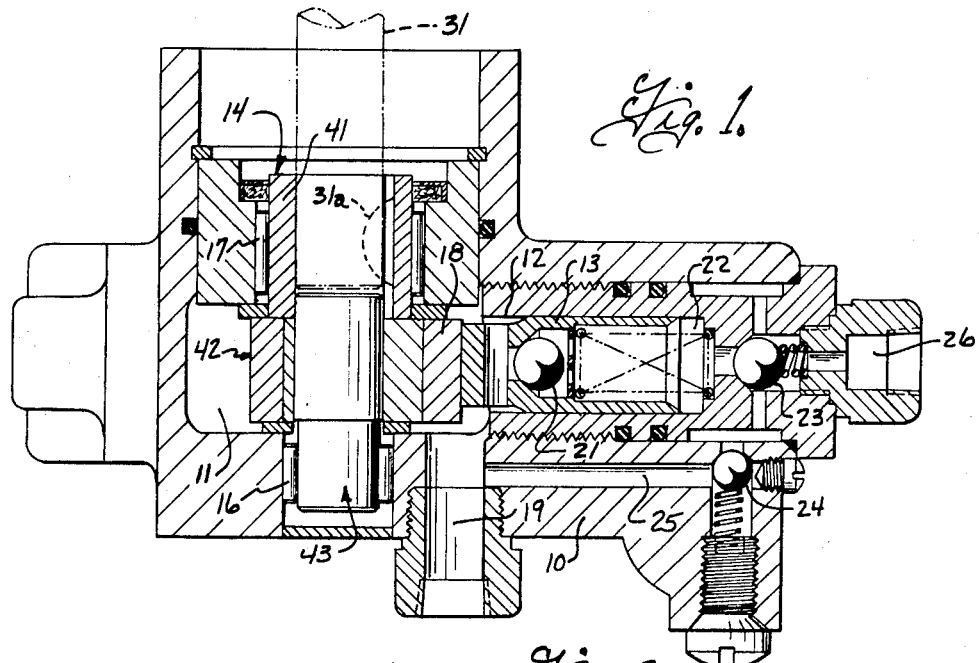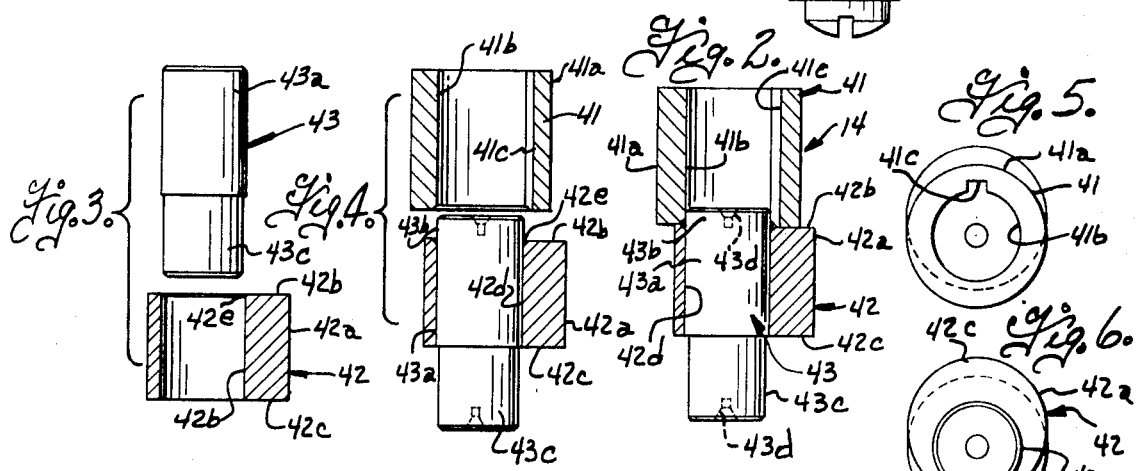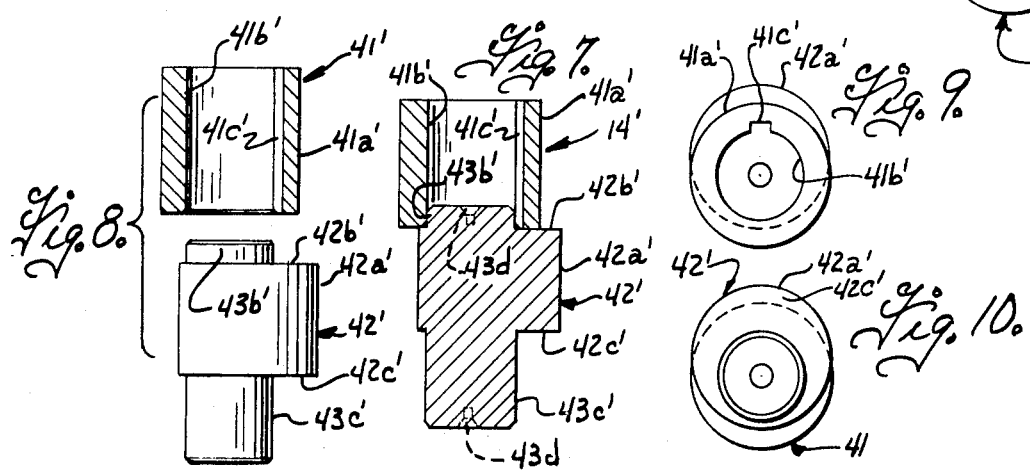

METHOD OF MAKING A CAM SHAFT WITH A SHAFT COUPLING AND ARTICLE PRODUCED THEREBY

BACKGROUND OF THE INVENTION

In some cam driven apparatus such as fluid pumps, fluid motors and the like it is desirable to closely couple an external shaft to the cam to minimize the overall size of the apparatus. In order to prevent leakage through the shaft in the fluid pumps and motors, it is also desirable to utilize a blind end coupling, that is a shaft coupling which is closed at its inner end. However, forming an internally keyed blind end coupling usually involves machining an internal annular recess adjacent the inner end of the coupling before forming the keyway by broaching or the like. This not only increases the expense of forming an internally keyed blind end coupling on a shaft, but also complicates the problem of locating the blind end coupling closely adjacent the cam.

SUMMARY OF THE INVENTION

In one aspect, the present invention involves an improved method of making a cam shaft having a trunnion at one end of the cam and a blind end shaft coupling internally of the trunnion for connection to an external shaft, the method including forming a shaft coupling having a cylindrical outer bearing surface and an internally keyed coaxial bore extending therethrough and dimensioned to receive the keyed end of an external shaft; forming a cam with a peripheral cam surface and a shaft stub extending from an end face of the cam eccentric to the peripheral cam surface with a diameter to tightly fit in the coupling bore and a length which is short as compared to its diameter and substantially shorter than the coupling, assembling the coupling onto the shaft stub with the stub extending into the coupling bore and the end face of the cam closing the end of the keyway in the coupling, and thereafter brazing the coupling to the cam to join the coupling to the cam and close the end of the bore and keyway in the coupling. The cam and shaft stub can be machined from one piece. In the preferred embodiment, however, the cam is formed with an eccentric bore having substantially the same diameter as the coupling bore and a shaft is pressed into the cam bore to a position with one end extending from the end face of the cam and the coupling is thereafter pressed onto that end of the shaft and against the cam.

In another aspect, the invention includes an improved cam shaft and shaft coupling assembly produced by the aforedescribed method and providing a cam shaft having a trunnion at one end of the cam and a blind end shaft coupling internally of the trunnion to enable driving connection to an external shaft to the cam at a location closely adjacent the end of the cam.

These, together with other features and advantages of this invention will become apparent from the following description when taken in connection with the accompanying drawings wherein:

FIG. 1 is a sectional view through a pump or motor apparatus utilizing a cam shaft and coupling assembly made in accordance with the present invention;

FIG. 2 is a longitudinal sectional view illustrating a presently preferred form of the cam shaft and coupling assembly;

FIG. 3 is an exploded view shown partially in section illustrating assembly of the cam and cam shaft;

FIG. 4 is an exploded view shown partially in section and illustrating assembly of the coupling onto the cam and cam shaft to form the cam shaft and coupling assembly of FIG. 2;

FIG. 5 is an end elevational view of one end of the cam shaft and coupling assembly of FIG. 2;

FIG. 6 is an end elevational view of the opposite end of the cam shaft and coupling assembly of FIG. 2;

FIG. 7 is a sectional view through a modified form of cam shaft and coupling assembly;

FIG. 8 is an exploded view illustrating assembly of the coupling on the cam shaft to form the cam shaft and coupling assembly of FIG. 7;

FIG. 9 is an end elevational view of one end of the cam shaft and coupling assembly of FIG. 7; and FIG. 10 is an end elevational view showing the opposite end of the cam shaft and coupling assembly of FIG. 7.

Referring now more specifically to FIG. 1, there is illustrated a pump or motor apparatus including a pump casing 10 defining an inlet chamber 11 and having a pump cylinder 12 therein. A piston 13 is slidable in the cylinder and is reciprocated therein under the control of the cam shaft and coupling assembly designated generally by the numeral 14. The cam shaft and coupling assembly is disposed in the inlet chamber 11 of the casing and is rotatably supported on the pump casing by bearings 16 and 17 and the assembly has a cam ring or a race 18 therearound that engages the inner ends of the pistons 13 to reciprocate the same. A fluid supply conduit 19 communicates with the pump inlet chamber and inlet valve means 21, conveniently located in the piston, control flow of fluid from the inlet chamber to the pumping chamber 22. Flow from the pumping chamber is controlled by a valve means such as check valve 23 in the pump casing, and a relief valve 24 can be provided to control flow through a relief passage 25, to limit the maximum pump discharge pressure delivered to the outlet conduit 26.

The pump or motor apparatus is driven by an external shaft shown in phantom and designated 31 and having a keyed end 31a. In order to minimize the overall size of the pump or motor apparatus, it is desirable to provide a shaft coupling closely adjacent the cam which drives the pump pistons. Moreover, since the cam and cam shaft are disposed in the pump inlet chamber 11, it is also desirable to provide a blind end shaft coupling, that is one which is closed at its inner end so as to prevent flow of fluid from the inlet chamber along the external shaft 31.

In the embodiment of the invention shown in FIGS. 1–6, the coupling member 41, cam member 42 and shaft member 43 are formed as separate elements and thereafter assembled to form the composite shaft and coupling member 14. The coupling member 41 comprises a tubular member having a smooth cylindrical outer bearing surface 41a, an axial bore 41b dimensioned to receive the end of the external shaft 31 and to have a working clearance therewith, and a keyway 41c that intersects the bore 41b to receive the key 31a on the external shaft. For example, with an external shaft having a diameter of five-eights inch, the coupling can be formed with a 1 inch O.D. and a bore I.D. slightly less than forty-one sixty-fourths inch to provide working clearance for the external shaft. The coupling member can be conveniently machined from bar stock and the outer bearing surface 41a can be ground to finish prior to assembly with the cam and cam shaft. The bore 41b extends completely through the coupling member and the keyway 41c also extends through the coupling member. Since the coupling member is open at opposite ends, keyway 41c is economically formed by broaching.

The cam member 42 is formed with a peripheral cam surface 42a and end faces 42b and 42c at opposite ends of the cam. A bore 42d is formed in the cam and, for reasons pointed out hereinafter, the bore 42d is formed with a diameter the same as, or substantially the same as, the diameter of the bore 41b in the coupling. The outer diameter of the cam surface 42a can advantageously be made the same as the outer diameter of the coupling.

The shaft member 43 is also conveniently machined from bar stock on centers 43d and includes a portion 43a having an outer diameter dimensioned to have a tight and preferably a press fit of about 0.003 inch in the cam bore 42d and coupling bore 41b. The portion 43a of the shaft member has an axial length sufficiently greater than the axial length of the cam 42 such that, when the shaft portion 43a is assembled into the cam with one end coterminous with one end face of the cam, the other end portion designated 43b will extend axially from the opposite end face of the cam a short distance to provide a shaft stub thereat. In order to minimize the overall length of the cam and coupling assembly and hence the overall length of the apparatus required, the projecting length 43b of the shaft is preferably made as short as possible, for example of the order of one-fourth of the shaft diameter. A reduced diameter trunnion 43c is formed on the other end of the shaft 43 to extend from the other end face 42c of the cam, coaxial with the shaft stub 43b for receiving a standard size bearing such as a ⅝ inch bearing that is smaller than the shaft portion 43a.

The shaft 43 is assembled into the cam 42 by pressing the shaft 43 axially into the bore 42c in the cam. In order to avoid loss of the press fit between the portion 43b that forms the shaft stub and the shaft coupling, the shaft 43 is pressed into the cam 42 beginning at the end remote from the portion 43b that forms the shaft stub, and until the other end of the shaft is flushed with the end face 42c of the cam. The coupling 41 is thereafter pressed axially onto the shaft stub 43b, with the keyway 41c in the coupling oriented toward the high side of the cam so that the end face of the cam overlies the end of the keyway.

The shaft coupling, cam and shaft are thereafter joined together by brazing. The brazing of the assembly is preferably achieved in the heat treating furnace during heat treating of the parts and, in order to assure proper joining of the coupling to the cam, some of the brazing material such as copper brazing paste is applied around the shaft stub 43b before assembling the coupling member onto the shaft stub. A small chamber such as indicated at 42e is provided at the end of the cam bore 42d to provide a well for receiving the brazing material. Additional brazing material is inserted into the coupling bore 42d onto the end of the shaft stub 43b, after assembly of the coupling onto the shaft stub, to assure forming an intimate bond therebetween. Since the several parts of the cam and coupling are accurately aligned during assembly and then brazed together, the bearing surface 41a on the coupling, cam surface 42a on the cam and trunnion 43c on the shaft can be machined and ground prior to assembly and the assembly requires little if any further finish grinding after the brazing and heat treating operation.

A modified form of cam shaft and coupling assembly is illustrated in FIGS. 8–10 and like numerals followed by the subscript prime (') are used to designate corresponding parts. In this embodiment, the shaft coupling 41' is also formed separate from the cam and cam shaft in a manner the same as that described previously in connection with the coupling 41 of FIGS. 1–6 to provide a cylindrical outer bearing surface 41a', a concentric inner bore 41b' and a keyway 41c'. In this embodiment, however, the cam 42' and the cam shaft 43' are formed of one piece. The cam 42' has an outer peripheral cam surface 42a' and end faces 42b' and 42c'. The shaft 43' includes a shaft stub 43b' which extends from one end face 42b' of the cam eccentric to the cam surface 42a', and a trunnion 43c' that extends axially from the other end of the cam, coaxial with the shaft stub 43b'. The cam and shaft can be machined from a piece of bar stock on centers 43d to provide the aforedescribed shaft stub 43b' having an outer diameter dimensioned to be press fit into the coupling bore 41b' and to also provide the aforedescribed trunnion 43c'. As in the preceding embodiment, the shaft coupling is joined to the cam by brazing and some brazing material is preferably added around the shaft stub 43b' on the cam before assembly of the coupling thereon, with additional brazing material added to the end of the coupling, before brazing the parts together in the heat treating furnace.

The shaft coupling 41, when assembled and joined to the cam and shaft in the manner described above, provides a trunnion at one end of the cam and a blind end shaft coupling internally of the trunnion and closely adjacent the cam so as to enable coupling of the end of the shaft 31 and key 31a to the cam at a point closely adjacent the cam. This minimizes the overall length of the cam and shaft coupling assembly and enables close coupling of the pump to the drive or driven apparatus (not shown). Moreover, formation of the coupling separate from the cam and cam shaft, markedly simplifies machining and forming of the cam and coupling. Since the coupling also forms one trunnion for the cam, and is radially supported by bearings in the pump apparatus, the loads imposed by the cam on the joint between the coupling and cam are largely shear loads on the shaft stub 43b.

While presently preferred embodiments of the invention have been herein disclosed in detail, it will be apparent to those skilled in the art that variations and modifications can be made within the scope of the appended claims.

The embodiments of the invention in which an exclusive property or privilege is claimed are defined as follows:

1. A method of making a cam shaft having a trunnion at one end of a cam and a blind end shaft coupling internally of the trunnion for connection to an external shaft comprising:

forming a shaft coupling having an axial bore and an internal keyway extending therethrough and dimensioned to have a working clearance with a keyed end of an external shaft, and forming a smooth cylindrical outer bearing surface on the shaft coupling coaxial with the bore;

forming a cam with a peripheral cam surface, a cam end face at one end of the cam surface, and a shaft stub extending from the cam end face eccentric to the peripheral cam surface and having a diameter to tightly fit in the coupling bore and a length which is short as compared to its diameter and substantially shorter than the coupling;

assembling the coupling onto the shaft stub with the shaft stub extending into one end of the coupling bore and with the end face of the cam engaging the end of the coupling and overlying the corresponding end of the keyway;

and brazing the shaft coupling to the shaft stub and to the end face of the cam to join the coupling to the cam and to close one end of the bore and keyway in the coupling.

2. The method of claim 1 including forming a trunnion on the end of the cam opposite the shaft stub and coaxial with the shaft stub.

3. A method of forming a cam shaft having a trunnion at one end of a cam and a blind end shaft coupling internally of the trunnion for connection to an external shaft comprising:

forming a shaft coupling having an axial bore and an internal keyway extending therethrough and dimensioned to have a working clearance with a keyed end of an external shaft, and forming a smooth cylindrical outer bearing surface on the shaft coupling coaxial with the bore;

forming a cam with a peripheral cam surface, end faces at opposite ends of the cam, and a bore extending through the cam eccentric to the peripheral cam surface and having a diameter substantially equal to the diameter of the bore in the coupling;

forming a shaft separate from the cam and coupling having an outer diameter to tightly fit in the cam bore and coupling bore and a length greater than the length of the cam;

assembling the shaft into the bore in the cam to a position in which one end of the shaft extends axially from one end face of the cam a short distance less than the diameter of the shaft to form a shaft stub thereat, and assembling one end of the coupling onto the shaft stub with the shaft stub extending into one end of the coupling bore and with the end face of the cam overlying the corresponding end of the keyway;

and brazing the end of the coupling to the shaft stub and to the end face of the cam.

4. The method of claim 3 wherein the shaft has a press fit in the bores in the cam and coupling and is first pressed into the cam bore beginning at the end of the shaft remote from said one end which forms the shaft stub.

5. The method of claim 4 including forming a reduced diameter trunnion on the end of the shaft remote from said one end before pressing the shaft into the bore in the cam.

6. The method of claim 3 wherein the cam and coupling are formed with substantially the same outer diameter.

* * * * *